US008788294B2

(12) United States Patent
Lutnick et al.

(10) Patent No.: US 8,788,294 B2
(45) Date of Patent: *Jul. 22, 2014

(54) PRODUCTS AND PROCESSES FOR INDICATING DOCUMENTS FOR A LIFE BASED PRODUCT

(75) Inventors: Howard W. Lutnick, New York, NY (US); Stuart A. Hersch, New York, NY (US); Laurence Rose, New York, NY (US)

(73) Assignee: CFPH, LLC, New York, NY (US)

(*) Notice: Subject to any disclaimer, the term of this patent is extended or adjusted under 35 U.S.C. 154(b) by 1144 days.

This patent is subject to a terminal disclaimer.

(21) Appl. No.: 11/847,982

(22) Filed: Aug. 30, 2007

(65) Prior Publication Data
US 2008/0183507 A1    Jul. 31, 2008

Related U.S. Application Data

(63) Continuation-in-part of application No. 11/613,182, filed on Dec. 19, 2006, which is a continuation-in-part of application No. PCT/US2006/040427, filed on Oct. 17, 2006.

(60) Provisional application No. 60/841,269, filed on Aug. 30, 2006.

(51) Int. Cl.
G06Q 40/00    (2012.01)

(52) U.S. Cl.
USPC ........ 705/4; 705/40; 705/80; 707/4; 707/100; 600/300

(58) Field of Classification Search
USPC .......... 705/35, 4, 36 T, 36 R, 80, 37, 40; 1/1; 707/999.1, E17.006, 4, 100; 600/300; 128/920
See application file for complete search history.

(56) References Cited

U.S. PATENT DOCUMENTS

| | | | |
|---|---|---|---|
| 4,969,094 A | 11/1990 | Halley et al. | |
| 5,673,402 A | 9/1997 | Ryan et al. | |
| 5,926,800 A | 7/1999 | Baronowski et al. | |
| 5,999,917 A | 12/1999 | Facciani et al. | |
| 6,219,651 B1* | 4/2001 | Bublitz et al. | 705/40 |
| 6,473,737 B2 | 10/2002 | Burke | |
| 6,684,189 B1 | 1/2004 | Ryan et al. | |
| 6,684,190 B1* | 1/2004 | Powers et al. | 705/36 R |
| 6,693,651 B2 | 2/2004 | Biebesheimer et al. | |
| 7,081,091 B2* | 7/2006 | Merrett et al. | 600/300 |
| 7,519,552 B2 | 4/2009 | Phelps | |
| 7,529,760 B2 | 5/2009 | Jennery | |
| 7,734,484 B2 | 6/2010 | Lutnick et al. | |
| 7,742,966 B2 | 6/2010 | Erlanger | |
| 8,219,423 B2 | 7/2012 | Hersch | |
| 8,396,724 B2 | 3/2013 | Lutnick et al. | |
| 8,457,994 B2 | 6/2013 | Hersch | |
| 2001/0011223 A1 | 8/2001 | Burke | |
| 2002/0042770 A1 | 4/2002 | Slyke et al. | |
| 2002/0072975 A1 | 6/2002 | Steele et al. | |
| 2002/0087534 A1* | 7/2002 | Blackman et al. | 707/4 |
| 2002/0111896 A1 | 8/2002 | Ben-Levy et al. | |
| 2002/0116231 A1 | 8/2002 | Hele et al. | |
| 2003/0110061 A1* | 6/2003 | Lakenbach et al. | 705/4 |
| 2003/0125992 A1 | 7/2003 | Rogers et al. | |
| 2003/0220867 A1 | 11/2003 | Goodwin et al. | |
| 2004/0044609 A1 | 3/2004 | Moore | |
| 2004/0059646 A1 | 3/2004 | Harrington et al. | |
| 2004/0064334 A1 | 4/2004 | Nye | |
| 2004/0064391 A1 | 4/2004 | Lange | |
| 2004/0098327 A1 | 5/2004 | Seaman | |
| 2004/0177021 A1 | 9/2004 | Carlson et al. | |
| 2004/0267647 A1* | 12/2004 | Brisbois | 705/35 |
| 2005/0027626 A1 | 2/2005 | Garcia | |
| 2005/0125261 A1 | 6/2005 | Adegan | |
| 2005/0177473 A1 | 8/2005 | Angle | |
| 2005/0182670 A1 | 8/2005 | Burgess | |
| 2005/0187869 A1 | 8/2005 | Buerger | |
| 2005/0192849 A1 | 9/2005 | Spalding | |
| 2005/0197857 A1 | 9/2005 | Avery | |
| 2005/0210048 A1* | 9/2005 | Beres et al. | 707/100 |
| 2005/0246267 A1 | 11/2005 | Nichols | |
| 2005/0273423 A1 | 12/2005 | Kiai et al. | |
| 2006/0031151 A1 | 2/2006 | Dorr | |

(Continued)

FOREIGN PATENT DOCUMENTS

| | | |
|---|---|---|
| JP | 2004-265076 | 9/2004 |
| JP | 2004-310761 | 11/2004 |
| WO | WO 2007/047605 | 4/2007 |
| WO | WO 2006/087810 | 8/2008 |

OTHER PUBLICATIONS

International Search Report on Patentability for International Application No. PCT/US2006/040427, dated Jul. 31, 2007 (1 page).
International Preliminary Report on Patentability for International Application No. PCT/US2006/040427, dated Apr. 23, 2008 (4 pages).
U.S. Appl. No. 11/550,303, filed Oct. 17, 2006, Lutnick, et al.
U.S. Appl. No. 11/613,182, filed Dec. 19, 2006, Lutnick, et al.
USPTO Office Action for U.S. Appl. No. 11/550,303, May 27, 2009 (11 pages).
USPTO Office Action for U.S. Appl. No. 11/613,182, Jun. 25, 2009 (8 pages).
Australian Examiner's Report for Application No. 2006304414, dated Aug. 14, 2009 (3 pages).
USPTO Examiner Interview Summary for U.S. Appl. No. 11/550,303, filed Oct. 13, 2009 (3 pages).
Japanese Office Action for Application No. 2008-536723 with English translation, dated Dec. 7, 2010 (6 pages).

(Continued)

Primary Examiner — Muhammad Shafi
Assistant Examiner — Sanjeev Malhotra
(74) Attorney, Agent, or Firm — Ruth Ma Swilling

(57) ABSTRACT

A method comprising receiving at least one document that is associated with a life insurance policy; assigning a respective value to each of the at least one document, in which the value indicates a level of importance; determining a summation of the at least one document; determining an indication for the life insurance policy, in which the indication is based on the summation of the at least one document and at least one of the values; and displaying the indication.

33 Claims, No Drawings

(56) References Cited

U.S. PATENT DOCUMENTS

| | | |
|---|---|---|
| 2006/0122871 A1 | 6/2006 | Cowley et al. |
| 2006/0178979 A1 | 8/2006 | Levine et al. |
| 2006/0206438 A1* | 9/2006 | Sakaue et al. ............ 705/80 |
| 2006/0287893 A1 | 12/2006 | Weiss et al. |
| 2006/0287894 A1 | 12/2006 | Weiss et al. |
| 2006/0293990 A1 | 12/2006 | Schaub |
| 2006/0293992 A1 | 12/2006 | Blair |
| 2006/0294002 A1 | 12/2006 | Brett |
| 2007/0050217 A1 | 3/2007 | Holden |
| 2007/0226015 A1 | 9/2007 | Lutnick et al. |
| 2007/0226123 A1 | 9/2007 | Lutnick et al. |
| 2007/0299760 A1 | 12/2007 | Lange et al. |
| 2008/0104021 A1 | 5/2008 | Cai et al. |
| 2008/0177582 A1 | 7/2008 | O'Brien et al. |
| 2009/0048961 A1 | 2/2009 | Mott |
| 2009/0119134 A1 | 5/2009 | Sakaue et al. |
| 2009/0164257 A1 | 6/2009 | Ramsden et al. |
| 2009/0192832 A1 | 7/2009 | Phelps |
| 2009/0204442 A1 | 8/2009 | Logsdon et al. |
| 2009/0204446 A1 | 8/2009 | Simon et al. |
| 2009/0271284 A1 | 10/2009 | Arbib |
| 2009/0281840 A1 | 11/2009 | Hersch |
| 2010/0211405 A1 | 8/2010 | Lutnick et al. |

OTHER PUBLICATIONS

"Purchasing of life insurance by cancer patient; venture company; the first in Japan; name change; refused by insurance company; the patient side to file a suit in the near future", Tokyo Shimbun, Feb. 7, 2005 (p. 1, front—in Japanese).

Australian Notice of Acceptance for Application No. 2006304414, dated Jan. 4, 2011 (3 pages).

USPTO Notice of Allowance and Fees Due and Examiner Interview Summary for U.S. Appl. No. 11/550,303, filed Jan. 25, 2010 (16 pages).

USPTO Office Action for U.S. Appl. No. 11/613,182, filed Apr. 13, 2010 (13 pages).

Notification of Transmittal or Search Report and Written Opinion of the ISA, or the Declaration for International Application No. PCT/US07/77240, May 30, 2008 (7 pages).

International Preliminary Report on Patentability for International Application No. PCT/US07/77240, dated Mar. 3, 2009 (4 pages).

U.S. Appl. No. 60/841,269, filed Aug. 30, 2006, Hersch et al.

U.S. Appl. No. 60/752,261, filed Dec. 19, 2005, Hersch.

U.S. Appl. No. 60/752,209, filed Dec. 19, 2005, Hersch.

U.S. Appl. No. 60/733,639, filed Nov. 4, 2005, Hersch.

U.S. Appl. No. 60/727,613, filed Oct. 17, 2005, Hersch.

Australian Examiner's Report for Application No. 2007289124, dated Feb. 25, 2010 (3 pages).

U.S. Appl. No. 12/767,291, filed Apr. 26, 2010, Inventor: Howard W. Lutnick, et al., entitled "Product and Processes for Managing Life Instruments" (58 pages).

USPTO Examiner Interview Summary for U.S. Appl. No. 11/550,303, filed May 13, 2009 (2 pages).

European Patent Office Communication and Extended Search Report for Application No. 06817009.1, dated Mar. 11, 2011 (9 pages).

Japanese Office Action with English translation for Application No. 2008-536723, mailed Dec. 13, 2011 (4 pages).

USPTO Notice of Allowance and Fees Due for U.S. Appl. No. 12/118,597, Mar. 6, 2012 (9 pages).

Joseph Giacalone, Analyzing an Emerging Industry: Viatical Transactions and the Secondary Market for Life Insurance Policies, Southern Business Review, Dated: 2001 (7 pages).

J. Belth, Viatical and Life Settlement Transactions, Contingencies.org; Mar./Apr. 2002 (4 pages).

Damien Rios, An Introduction to the Use of Viatical and Life Settlements, Dated: 2004 (13 pages).

Canadian Examiner's Report for Application No. 2639699, dated May 22, 2012 (2 pages).

USPTO Office Action for U.S. Appl. No. 12/767,291, filed Nov. 25, 2011 (13 pages).

USPTO Office Action for U.S. Appl. No. 11/613,182, filed Sep. 6, 2011 (3 pages).

USPTO Examiner's Answer to Appeal Brief for U.S. Appl. No. 11/613,182, filed Sep. 9, 2011 (18 pages).

USPTO Order Remanding Appeal to Examiner for U.S. Appl. No. 11/613,182, filed Nov. 28, 2011 (3 pages).

USPTO Petition Decision for U.S. Appl. No. 11/613,182, filed Dec. 9, 2011 (2 pages).

Australian Examiner's Report for Application No. 2011201723, dated Jan. 17, 2012 (2 pages).

Canadian Examiner's Report for Application No. 2661905, dated Jan. 18, 2012 (4 pages).

USPTO Notice of Allowance and Fees Due and Examiner Interview Summary for U.S. Appl. No. 12/767,291, filed Nov. 7, 2012 (12 pages).

Japanese Office Action for Application No. 2009-526911 with English translation, dated Oct. 24, 2012 (10 pages).

USPTO Office Action for U.S. Appl. No. 13/541,056, filed Aug. 29, 2012 (25 pages).

USPTO Office Action for U.S. Appl. No. 13/793,299, filed Nov. 8, 2013 (11 pages).

USPTO Notice of Allowance and Fees Due for U.S. Appl. No. 13/541,056, filed Apr. 16, 2013 (12 pages).

U.S. Appl. No. 13/793,299, filed Mar. 11, 2013, Lutnick, et al.

Australian Examiner's Report for Application No. 2011253656, dated Mar. 24, 2014 (3 pages).

Canadian Examiner's Report for Application No. 2661905, dated Feb. 5, 2014 (4 pages).

Canadian Examiner's Report for Application No. 2639699, dated Jan. 9, 2014 (3 pages).

* cited by examiner

PRODUCTS AND PROCESSES FOR INDICATING DOCUMENTS FOR A LIFE BASED PRODUCT

This application claims the benefit U.S. Provisional Patent Application Ser. No. 60/841,269, filed Aug. 30, 2006.

This application is a continuation-in-part of U.S. patent application Ser. No. 11/613,182, filed Dec. 19, 2006; and is a continuation-in-part of International Patent Application No. PCT/US2006/040427, filed Oct. 17, 2006 each of which is incorporated by reference herein in its entirety.

DETAILED DESCRIPTION

A. System Implementation

Owners of life insurance policies sometimes find that they no longer need or can no longer afford their policies. As a result, some of these policy owners may choose to surrender the policy back to the insurance company in exchange for the policy's cash value. Other policy owners, however, may sell their existing policies to a third-party investor who will collect the death benefit upon the death of the insured. In return the investor pays the policy owner a settlement amount, which will be a value less than that of the value of the life insurance, and will take over payment of the life insurance premiums. The settlement amount is affected by a number of factors, including considerations for the insured's estimated mortality, or life expectancy, and the associated cost of premiums to keep the policy in force for that timeframe. Oftentimes, the policy owner does not sell directly to the third-party investor, but rather, the parties transact through a licensed broker.

Provided are products and processes for assisting the sale and purchase of life insurance policies over the Internet. Specifically, provided are products and processes for providing an accurate indication of the reliability and value of a life insurance policy. Although the term "life insurance" is used throughout the disclosure, it is understood that the described embodiments may be used to evaluate any instruments based on an individual's life span, such as an annuity.

In one embodiment, a system may include one or more workstations. Workstations may be local or remote, and are connected by one or more communications links to a computer network that is linked via the communications links to a server.

For example, the server may be any suitable server, processor, computer, or data processing device, or combination of the same. The server may be used to process, evaluate and search the life insurance policies located on the system.

The computer network may be any suitable computer network, including the Internet, an intranet, a wide-area network (WAN), a local-area network (LAN), a wireless network, a digital subscriber line (DSL) network, a frame relay network, an asynchronous transfer mode (ATM) network, a virtual private network (VPN), a general packet radio service (GPRS) network, or any combination of any of the same. The communications links may be any communications links suitable for communication data between workstations and the server, such as network links, dial-up links, wireless links, hard-wired links, fiber-optical links, etc.

The workstation may be computing devices, personal computers, laptop computers, mainframe computers, dumb terminals, data displays, Internet browsers, Personal Digital Assistants (PDAs), two-way pagers, wireless terminals, portable telephones, hand-held electronic devices, any other device that is capable of processing and computing information, or any combination of the same. The workstations may be used to sell life insurance policies, as well as uploading relevant supporting documents. The workstations also may be used to search, review, bid and purchase life insurance policies.

The communications link may be any communications links suitable for communicating data between the server and the workstations, such as network links, dial-up links, wireless links, hard-wired links, fiber-optical links, etc.

The workstation may include a processor, a display, an input device, and a memory, which may be interconnected. In an embodiment, the memory contains a storage device for storing a workstation program for controlling a processor. The processor may be used to run any of the steps for the methods and processes described below. Likewise, a display is available to display, such steps and search results. Furthermore, an input device may be used by the user to upload various relevant supporting documents and information, enter search criteria, and make bids and offers for the life insurance polices.

The server may include the processor, the display, the input device, and memory, all of which may be interconnected. In an embodiment, the memory contains a storage device for storing the supporting documents associated with a life insurance policy and the search profiles sent by the user. The storage device further contains a server program for controlling the processor. The processor uses the server program to evaluate a life insurance policy, especially for evaluating the supporting documents associated with the life insurance policy. The processor also may be used to match the search profile with the life insurance policies stored within the system. In addition, the processor can cause the system to send notification messages to users.

C. Methods and Processes

In one embodiment, a user may wish to sell a life insurance policy using the system. A user may browse the system for recently listed life insurance policies in order to determine a reasonable price for her life insurance policy. In certain embodiment, the user may limit the search only to life insurance policies that share similar characteristics with the user's life insurance policy. As will be described in detail below, in certain embodiments, the user also may be a buyer of a life insurance policy. The buyer may use the system in order to purchase a life insurance policy.

A user of the system may create an account and a profile. For example, the user may click on the "Create Account" link on the homepage of the system. By doing so, the system directs her to a "Create Profile" page, where the user is instructed to choose a login name and password. The user may be instructed to enter personal information (e.g., name, address, birth date, etc.) into the system. In some embodiments, the fields are marked with an asterisk (*) in order to distinguish between the required and non-required fields. Once the user has finished entering personal information, the user may click on the button "Register". The system may store the newly created profile into memory and automatically redirects the user back to the initial login page.

The user logs into the system using the newly created profile. In certain embodiments, the system authenticates the login and password, and if the return value is "True", then the user may be directed to the main page, e.g. the Life Markets Page. If the return value is "False", then the system may alerts the user that the login and password are incorrect and asks the user to re-enter such details. For security reasons, some embodiments of the system may limit the number of attempts a user may make before locking the login process and requiring the user to contact a customer service agent for further assistance.

Assuming that the user successfully logs into the system, the user may choose from several options. In some embodiments, the options may be displayed as a tab on the upper portion of the display screen. These tabs may be labeled "Sell", "Search", "Buy," which correspond, respectively, to the act of selling a life insurance policy, searching the system for a particular life insurance policy, and purchasing a life insurance policy.

If the user selects the "Sell" tab, then the user is directed to a new webpage and instructed to enter information regarding the life insurance policy that she wishes to sell. Such information may include the life insurance company, the value of the policy, the term, the remaining payment amounts, etc. Using this same page, the user also may upload one or more relevant supporting documents that are associated with the life insurance policy. A relevant supporting document may include, but is not limited to, a life settlement application, an indicative purchase offer, a life settlor's letter notifying insurer of sale of policy and VOC request, a physician's letter of competency regarding insured, a consent of a life settlor's spouse, an overview of life settlement process, an acknowledgement of life settlement transaction, a consent to change of beneficiary and release and waiver of beneficiary rights, a life settlement proceeds distribution form, an insured's designation of contacts, an acknowledgment of primary designated contact responsibility, an acknowledgment of alternate designated contact responsibility, an insured's letter of designated contact, an escrow agreement, an authorization for disclosure of protected health information, an authorization of insured for use and disclosure of nonpublic personal information, a policy owner's authorization for disclosure of life insurance policy information, a life insurance policy owner's disclosure of liens, an acknowledgment of life settler, a life settlement agreement, a disclosure form, and a verification of coverage form.

In some embodiments, the user does not upload any relevant supporting documents. Instead, the user merely provides the location of the document; or the user may provide some other source or manner of obtaining the documents. The system then obtains the document directly from the indicated source. For example, a user may wish to designate that the system contact her primary care physician in order to obtain certain medical records.

Upon receipt of a document, the system authenticates the document. Various methods of authentication exist for different types of documents. In some embodiments, the system may require only the submission of certified documents. The system also may require a signature and notarization of the document. Likewise, the system may submit the document to a third-party for review in order to determine the authenticity of the document. Still in other embodiments, the system obtains the document directly from a third-party source designated by the user. In such instances, the system may authenticate the third-party source, such as requiring proof of certain accreditations by a hospital or medical office. Once the third-party source is authenticated, then it is registered on the system as a participating third-party source. Any document submitted by a participating third-party source is considered properly authenticated. For example, a system may authenticate a medical report by obtaining the medical report directly from a participating medical office or hospital. A medical office or hospital may be allowed to participate within the system only if it fulfills certain criteria (e.g., accreditation) and also is registered on the system. In the event that the system is notified of any fraudulent practices by a participating medical office, then the system may remove or refuse participation to the offending medical office. If a system cannot authenticate a particular document, it will reject the document and notify the user. However, in other embodiments, an unauthenticated document also may be stored in the system, but assigned a low value, as will be described in detail below.

After the document has been authenticated, the system may also evaluate the completeness of the document. The system reviews the documents for any missing information, and may prompt the user to supply any such missing elements. Similar to the authentication process, the method of evaluating a document's completion may vary for each document. In some embodiments, the system performs a simple completion test based on the number of pages indicated by the user. For example, if the user indicates that five pages of a medical profile were uploaded, the system will verify that all five pages of the medical profile have been uploaded. Still in more advanced systems, a pre-determined set of criteria may be assigned to each type of document. Whenever a user uploads a document, she will indicate the document's type. The system will apply the appropriate pre-determined criterion in order to determine the completeness and/or authenticity of the document. If the system determines that a particular document is incomplete, it rejects the document and notifies the user. In other embodiments, the system may notify the user of the missing elements and request that the user supply such missing elements. Still other embodiments may store the incomplete document on the system, but assign the document with a low value.

Once a document has been successfully authenticated and verified for completeness, the system evaluates the document in order to assign a value. A value indicates the level of importance of the document in relation to the sale of the life insurance policy. The determination of value may be based on the type of document. For example, a medical record may receive a higher value than a legal document. A table of values may exist, so that each type of document is assigned a respective value. The value also may be derived from a set of equations or formulas as embodied in a software program. In still other embodiments, the value is determined from a decision tree containing one or more conditional statements. For example, the decision tree may indicate that if the document was derived from Hospital A, then it is assigned a high value. However, if the document was derived from Hospital B, then it is assigned a medium value. The value may be indicated by an alphanumerical system (e.g. the characters A to Z and/or the numbers 0 to 9), a color-scheme, a percentage, or a combination of them. In some embodiments, the value may be pre-determined by the user. Thus, the procedures for determining the value, as described above, may serve as the default standard only. A user can override this default value system by customizing a different set of values. In another embodiment, a user may receive a customized set of values from a third-party. For example, in an office environment, an administrator may customize a set of values for the documents, and then proceed to send the customized set of values to various recipients in the office.

Typically, the higher the number of supporting documents, the more reliable is the value associated with the life insurance policy. Thus, the system may also maintain an internal counter which tracks the number of documents associated with a particular life insurance policy. Assuming that a document is properly authenticated and verified for completeness, the counter is updated automatically by one. Thus, at any given moment in time, the system can accurately determine the summation of the total number of documents associated with a life insurance policy.

Alternatively, there may be a pre-set number of required documents for a type of life insurance policy. For example, a life insurance policy of a terminally ill cancer patient may require, at the very least, a medical report from the primary care physician, a laboratory report from the radiologist, an evaluation from the oncologist, a notarized living will that has been evaluated and approved by an estate lawyer, etc. The summation may indicate the percentage of the documents that have been received. The system may also use a combination of the various methods described above for evaluation.

Both the value and the number of supporting documents also affect the overall indication, or rating assigned to a life insurance policy. A rating is an indication by the system on the investment quality of the life insurance policy. This rating is similar to the securities rating that a bond issuer might receive from an independent, professional credit rating service.

In an embodiment, the rating may be indicated by a color scheme, in which each color is associated with a value or a piece of information. For example, the color green may indicate life insurance policies that include all the required relevant supporting documents. A green indication also may indicate that the system has evaluated the supporting documents, and it has designed the life insurance policy to have the highest rating. On the other hand, a red indication, for example, may indicate a lack of supporting documents. A red indication also may indicate that the system considers the available supporting documents to be unreliable (e.g., the documents are unauthenticated, incomplete, or received a low value). Various other colors also may be used to represent various gradients of a rating.

After the user has finished uploading or designating the location of various relevant supporting documents, the system may save the data associated with these documents into a database located within the memory. By doing so, the system may allow future users (e.g., buyers) to search and locate these documents. As described above, the system also may be used by a buyer of a life insurance policy. The buyer must register and create a profile, using a process similar to the one described above for a seller. Once the buyer logs into the system, he may have several options, including searching the available life insurance policies and making a bid on a life insurance policy.

In an embodiment, the user may click on a "Search" tab, which will direct the user to a new webpage. The user then may create a search profile by entering one or more search criteria. Search criteria may include at least one of the following: the number of documents received, the value of the documents, the indication, the age of policy holder, the life expectancy of the policy holder, a type of life insurance policy, a type of disease (e.g., cancer, AIDS, etc.) affecting the life insurance holder, or a geographic location.

The system receives the search profile and matches the elements of the search profile with the life insurance policies stored on the system. In an embodiment, the system assigns a percentage value of each "hit", or life insurance policy that includes one or more of the desired search criteria. The system then organizes the "hits" in accordance to a percentage value, and displays the search results in such an order. For example, a user may wish to search for a life insurance policy held by a male over the age 60 years with an estimated life term of less than one year and whose life insurance pay-out is greater than $500,000. In another example, a user may wish to search for life insurance policies that have received a green indication rating and have monthly premiums less than $500.

After receiving the search results, the user may opt to conduct a new search, or the user may wish to refine the search results. The user may also double-click on a life insurance policy in order to review the life insurance policy and/or the supporting documents in further detail. The user also may submit a bid to purchase the life insurance policy. Various methods of electronically bidding, trading and buying insurance policies are known. For example, the details regarding the systems and methods of electronically trading insurance policies may be incorporated by reference through patent Ser. No. 60/727,613, entitled "Systems and Method for Electronically Trading Insurance Policies", field on Oct. 17, 2005."

In addition, the system may also provide an alert function to the user. The user may save a particular search profile to the system's database. The system then automatically attempts to match the search profile with life insurance policies within the database at regular intervals (e.g., daily, monthly, etc.) The system also may compare any new search results with the most recent search result in order to determine if there are new hits. If a new hit is determined, then the system may alert the user via a communications means. The user may log into the system to review the new hits. An alert may be sent via an e-mail message, a telephone call, postal mail, or it may be merely displayed on a sidebar on the main Life Markets Page, as described earlier.

Other modifications and variations will be apparent to those skilled in the art.

C. General Matters

1. Terms

The term "product" means any machine, manufacture and/or composition of matter, unless expressly specified otherwise.

The term "process" means any process, algorithm, method or the like, unless expressly specified otherwise.

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

The terms "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise.

The term "variation" of an invention means an embodiment of the invention, unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "plurality" means "two or more", unless expressly specified otherwise.

The term "herein" means "in the present application, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car and a wheel.

Numerical terms such as "one", "two", etc. when used as cardinal numbers to indicate quantity of something (e.g., one widget, two widgets), mean the quantity indicated by that numerical term, but do not mean at least the quantity indicated by that numerical term. For example, the phrase "one widget" does not mean "at least one widget", and therefore the phrase "one widget" does not cover, e.g., two widgets.

The phrase "based on" does not mean "based only on", unless expressly specified otherwise. In other words, the phrase "based on" describes both "based only on" and "based at least on".

The term "represent" and like terms are not exclusive, unless expressly specified otherwise. For example, the term "represents" do not mean "represents only", unless expressly specified otherwise. In other words, the phrase "the data represents a credit card number" describes both "the data represents only a credit card number" and "the data represents a credit card number and the data also represents something else".

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms mean "for example", and thus does not limit the term or phrase it explains. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "i.e." and like terms mean "that is", and thus limits the term or phrase it explains. For example, in the sentence "the computer sends data (i.e., instructions) over the Internet", the term "i.e." explains that "instructions" are the "data" that the computer sends over the Internet.

2. Determining

The term "determining" and grammatical variants thereof (e.g., to determine a price, determining a value, determine an object which meets a certain criterion) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The term "determining" does not imply certainty or absolute precision, and therefore "determining" can include estimating, predicting, guessing and the like.

The term "determining" does not imply that mathematical processing must be performed, and does not imply that numerical methods must be used, and does not imply that an algorithm or process is used.

The term "determining" does not imply that any particular device must be used. For example, a computer need not necessarily perform the determining.

3. Disclosed Examples and Terminology are not Limiting

Neither the Title (set forth at the beginning of the first page of the present application) nor the Abstract (set forth at the end of the present application) is to be taken as limiting in any way as the scope of the disclosed invention(s). An Abstract has been included in this application merely because an Abstract of not more than 150 words is required under 37 C.F.R. §1.72(b).

The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

The present disclosure is not a literal description of all embodiments of the invention(s). Also, the present disclosure is not a listing of features of the invention(s) which must be present in all embodiments.

Devices that are described as in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for long period of time (e.g. weeks at a time). In addition, devices that are in communication with each other may communicate directly or indirectly through one or more intermediaries.

A description of an embodiment with several components or features does not imply that all or even any of such components/features are required. On the contrary, a variety of optional components are described to illustrate the wide variety of possible embodiments of the present invention(s). Unless otherwise specified explicitly, no component/feature is essential or required.

Although process steps, algorithms or the like may be described in a particular sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention(s), and does not imply that the illustrated process is preferred.

Although a process may be described as including a plurality of steps, that does not imply that all or any of the steps are preferred, essential or required. Various other embodiments within the scope of the described invention(s) include other processes that omit some or all of the described steps. Unless otherwise specified explicitly, no step is essential or required.

Although a process may be described singly or without reference to other products or methods, in an embodiment the process may interact with other products or methods. For example, such interaction may include linking one business model to another business model. Such interaction may be provided to enhance the flexibility or desirability of the process.

Although a product may be described as including a plurality of components, aspects, qualities, characteristics and/or features, that does not indicate that any or all of the plurality are preferred, essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

An enumerated list of items (which may or may not be numbered) does not imply that any or all of the items are equivalent to each other or readily substituted for each other.

4. Computing

It will be readily apparent to one of ordinary skill in the art that the various processes described herein may be implemented by, e.g., appropriately programmed general purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions.

A "processor" means one or more microprocessors, central processing units (CPUs), computing devices, microcontrollers, digital signal processors, or like devices or any combination thereof.

Thus a description of a process is likewise a description of an apparatus for performing the process. The apparatus that performs the process can include, e.g., a processor and those input devices and output devices that are appropriate to perform the process.

Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any medium that participates in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), SAP, ATP, Bluetooth™, and TCP/IP, TDMA, CDMA, and 3G; and/or (iv) encrypted to ensure privacy or prevent fraud in any of a variety of ways well known in the art.

Thus a description of a process is likewise a description of a computer-readable medium storing a program for performing the process. The computer-readable medium can store (in any appropriate format) those program elements which are appropriate to perform the method.

Just as the description of various steps in a process does not indicate that all the described steps are required, embodiments of an apparatus include a computer/computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel® Pentium® or Centrino™ processor, that are adapted to communicate with the computer. Any number and type of devices may be in communication with the computer.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

Where a process is described, in an embodiment the process may operate without any user intervention. In another embodiment, the process includes some human intervention (e.g., a step is performed by or with the assistance of a human).

5. Continuing Applications

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicants intend to file additional applications to pursue patents for subject matter that has been disclosed and enabled but not claimed in the present application.

The following sections I-X provide a guide to interpreting the present application.

I. Terms

The term "product" means any machine, manufacture and/or composition of matter, unless expressly specified otherwise.

The term "process" means any process, algorithm, method or the like, unless expressly specified otherwise.

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

The term "invention" and the like mean "the one or more inventions disclosed in this application", unless expressly specified otherwise.

The terms "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise.

The term "variation" of an invention means an embodiment of the invention, unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "plurality" means "two or more", unless expressly specified otherwise.

The term "herein" means "in the present application, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car and a wheel. The phrase "at least one of", when such phrase modifies a plurality of things does not mean "one of each of" the plurality of things.

Numerical terms such as "one", "two", etc. when used as cardinal numbers to indicate quantity of something (e.g., one widget, two widgets), mean the quantity indicated by that numerical term, but do not mean at least the quantity indicated by that numerical term. For example, the phrase "one widget" does not mean "at least one widget", and therefore the phrase "one widget" does not cover, e.g., two widgets.

The phrase "based on" does not mean "based only on", unless expressly specified otherwise. In other words, the phrase "based on" describes both "based only on" and "based at least on". The phrase "based at least on" is equivalent to the phrase "based at least in part on".

The term "represent" and like terms are not exclusive, unless expressly specified otherwise. For example, the term "represents" do not mean "represents only", unless expressly specified otherwise. In other words, the phrase "the data represents a credit card number" describes both "the data represents only a credit card number" and "the data represents a credit card number and the data also represents something else".

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms mean "for example", and thus does not limit the term or phrase it explains. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first such machine has a function and the second such machine has a function as well. The function of the first machine may or may not be the same as the function of the second machine.

The term "i.e." and like terms mean "that is", and thus limits the term or phrase it explains. For example, in the sentence "the computer sends data (i.e., instructions) over the Internet", the term "i.e." explains that "instructions" are the "data" that the computer sends over the Internet.

Any given numerical range shall include whole and fractions of numbers within the range. For example, the range "1 to 10" shall be interpreted to specifically include whole numbers between 1 and 10 (e.g., 1, 2, 3, 4, . . . 9) and non-whole numbers (e.g., 1.1, 1.2, . . . 1.9).

Where two or more terms or phrases are synonymous (e.g., because of an explicit statement that the terms or phrases are synonymous), instances of one such term/phrase does not mean instances of another such term/phrase must have a different meaning. For example, where a statement renders the meaning of "including" to be synonymous with "including but not limited to", the mere usage of the phrase "including but not limited to" does not mean that the term "including" means something other than "including but not limited to".

II. Determining

The term "determining" and grammatical variants thereof (e.g., to determine a price, determining a value, determine an object which meets a certain criterion) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The term "determining" does not imply certainty or absolute precision, and therefore "determining" can include estimating, extrapolating, predicting, guessing and the like.

The term "determining" does not imply that mathematical processing must be performed, and does not imply that numerical methods must be used, and does not imply that an algorithm or process is used.

The term "determining" does not imply that any particular device must be used. For example, a computer need not necessarily perform the determining.

III. Forms of Sentences

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device, article or other product is described herein, more than one device/article (whether or not they cooperate) may alternatively be used in place of the single device/article that is described. Accordingly, the functionality that is described as being possessed by a device may alternatively be possessed by more than one device/article (whether or not they cooperate).

Similarly, where more than one device, article or other product is described herein (whether or not they cooperate), a single device/article may alternatively be used in place of the more than one device or article that is described. For example, a plurality of computer-based devices may be substituted with a single computer-based device. Accordingly, the various functionality that is described as being possessed by more than one device or article may alternatively be possessed by a single device/article.

The functionality and/or the features of a single device that is described may be alternatively embodied by one or more other devices which are described but are not explicitly described as having such functionality/features. Thus, other embodiments need not include the described device itself, but rather can include the one or more other devices which would, in those other embodiments, have such functionality/features.

IV. Disclosed Examples and Terminology are not Limiting

Neither the Title (set forth at the beginning of the first page of the present application) nor the Abstract (set forth at the end of the present application) is to be taken as limiting in any way as the scope of the disclosed invention(s). An Abstract has been included in this application merely because an Abstract of not more than 150 words is required under 37 C.F.R. §1.72(b).

The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

No embodiment of method steps or product elements described in the present application constitutes the invention claimed herein, or is essential to the invention claimed herein, or is coextensive with the invention claimed herein, except where it is either expressly stated to be so in this specification or expressly recited in a claim.

The preambles of the claims that follow recite purposes, benefits and possible uses of the claimed invention only and do not limit the claimed invention.

The present disclosure is not a literal description of all embodiments of the invention(s). Also, the present disclosure is not a listing of features of the invention(s) which must be present in all embodiments.

Devices that are described as in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for long period of time (e.g. weeks at a time). In addition, devices that are in communication with each other may communicate directly or indirectly through one or more intermediaries.

A description of an embodiment with several components or features does not imply that all or even any of such components/features are required. On the contrary, a variety of optional components are described to illustrate the wide variety of possible embodiments of the present invention(s). Unless otherwise specified explicitly, no component/feature is essential or required.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention(s), and does not imply that the illustrated process is preferred.

Although a process may be described as including a plurality of steps, that does not imply that all or any of the steps are preferred, essential or required. Various other embodiments within the scope of the described invention(s) include other processes that omit some or all of the described steps. Unless otherwise specified explicitly, no step is essential or required.

Although a process may be described singly or without reference to other products or methods, in an embodiment the process may interact with other products or methods. For example, such interaction may include linking one business model to another business model. Such interaction may be provided to enhance the flexibility or desirability of the process.

Although a product may be described as including a plurality of components, aspects, qualities, characteristics and/or features, that does not indicate that any or all of the plurality are preferred, essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

An enumerated list of items (which may or may not be numbered) does not imply that any or all of the items are equivalent to each other or readily substituted for each other.

All embodiments are illustrative, and do not imply that the invention or any embodiments were made or performed, as the case may be.

V. Computing

It will be readily apparent to one of ordinary skill in the art that the various processes described herein may be implemented by, e.g., appropriately programmed general purpose computers, special purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions. Instructions may be embodied in, e.g., one or more computer programs, one or more scripts.

A "processor" means one or more microprocessors, central processing units (CPUs), computing devices, microcontrollers, digital signal processors, or like devices or any combination thereof, regardless of the architecture (e.g., chip-level multiprocessing/multi-core, RISC, CISC, Microprocessor without Interlocked Pipeline Stages, pipelining configuration, simultaneous multithreading).

Thus a description of a process is likewise a description of an apparatus for performing the process. The apparatus that performs the process can include, e.g., a processor and those input devices and output devices that are appropriate to perform the process.

Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any medium, a plurality of the same, or a combination of different media, that participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), SAP, ATP, Bluetooth™, and TCP/IP, TDMA, CDMA, and 3G; and/or (iv) encrypted to ensure privacy or prevent fraud in any of a variety of ways well known in the art.

Thus a description of a process is likewise a description of a computer-readable medium storing a program for performing the process. The computer-readable medium can store (in any appropriate format) those program elements which are appropriate to perform the method.

Just as the description of various steps in a process does not indicate that all the described steps are required, embodiments of an apparatus include a computer/computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel® Pentium® or Centrino™ processor, that are adapted to communicate with the computer. Any number and type of devices may be in communication with the computer.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

Where a process is described, in an embodiment the process may operate without any user intervention. In another embodiment, the process includes some human intervention (e.g., a step is performed by or with the assistance of a human).

VI. Continuing Applications

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application.

Applicants intend to file additional applications to pursue patents for subject matter that has been disclosed and enabled but not claimed in the present application.

VII. 35 U.S.C. §112, Paragraph 6

In a claim, a limitation of the claim which includes the phrase "means for" or the phrase "step for" means that 35 U.S.C. §112, paragraph 6, applies to that limitation.

In a claim, a limitation of the claim which does not include the phrase "means for" or the phrase "step for" means that 35 U.S.C. §112, paragraph 6 does not apply to that limitation, regardless of whether that limitation recites a function without recitation of structure, material or acts for performing that function. For example, in a claim, the mere use of the phrase "step of" or the phrase "steps of" in referring to one or more steps of the claim or of another claim does not mean that 35 U.S.C. §112, paragraph 6, applies to that step(s).

With respect to a means or a step for performing a specified function in accordance with 35 U.S.C. §112, paragraph 6, the corresponding structure, material or acts described in the specification, and equivalents thereof, may perform additional functions as well as the specified function.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in the present application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. §112, paragraph 6, structure corresponding to a specified function includes any product programmed to perform the specified function. Such structure includes programmed products which perform the function, regardless of whether such product is programmed with (i) a disclosed algorithm for performing the function, (ii) an algorithm that is similar to a disclosed algorithm, or (iii) a different algorithm for performing the function.

Where there is recited a means for performing a function that is a method, one structure for performing this method includes a computing device (e.g., a general purpose computer) that is programmed and/or configured with appropriate hardware to perform that function. Also includes a computing device (e.g., a general purpose computer) that is programmed and/or configured with appropriate hardware to perform that function via other algorithms as would be understood by one of ordinary skill in the art.

VIII. Disclaimer

Numerous references to a particular embodiment does not indicate a disclaimer or disavowal of additional, different embodiments, and similarly references to the description of embodiments which all include a particular feature does not indicate a disclaimer or disavowal of embodiments which do not include that particular feature. A clear disclaimer or disavowal in the present application shall be prefaced by the phrase "does not include" or by the phrase "cannot perform".

IX. Incorporation by Reference

Any patent, patent application or other document referred to herein is incorporated by reference into this patent application as part of the present disclosure, but only for purposes of written description in accordance with 35 U.S.C. §112, paragraph 1 and enablement in accordance with 35 U.S.C. §112, paragraph 1, and should in no way be used to limit, define, or otherwise construe any term of the present application where the present application, without such incorporation by reference, would not have failed to provide an ascertainable meaning, but rather would have allowed an ascertainable meaning for such term to be provided. Thus, the person of ordinary skill in the art need not have been in any way limited by any embodiments provided in the reference Any incorporation by reference does not, in and of itself, imply any endorsement of, ratification of or acquiescence in any statements, opinions, arguments or characterizations contained in any incorporated patent, patent application or other document, unless explicitly specified otherwise in this patent application.

X. Prosecution History

In interpreting the present application (which includes the claims), one of ordinary skill in the art shall refer to the prosecution history of the present application, but not to the prosecution history of any other patent or patent application, regardless of whether there are other patent applications that are considered related to the present application, and regardless of whether there are other patent applications that share a claim of priority with the present application.

What is claimed is:

1. A method comprising
   receiving via a processor an indication that an insured intends to sell a life insurance policy in exchange for a settlement amount;
   transmitting to a remote device a request for at least one document that supports that the life insurance policy, in which the remote device and the processor are in communication over a network;
   receiving via the processor, in response to the request, the at least one document that supports the life insurance policy;
   determining a respective quality for each received document based on at least one of: a source of the document, a type of the document, and a pre-determined level of importance of the document;
   determining via the processor a quantity of documents received in response to the request;
   assigning via the processor, based on the quantity of documents received and the quality of each received document, a rating to the life insurance policy, in which the rating affects the settlement amount; and
   displaying the rating that is assigned to the life insurance policy.

2. The method of claim 1 further comprising:
   transmitting a request to authenticate at least one received document; and
   receiving an authentication of the at least one received document.

3. The method of claim 1, in which the act of determining the respective quality of each received document further comprising:
   determining the quality based on a decision tree.

4. The method of claim 1, in which the act of displaying the rating further comprises:
   displaying a color that is based on the rating.

5. The method of claim 4, in which the act of displaying a color further comprises:
   assigning a respective color based on each rating, in which a first color corresponds to a first rating and a second color corresponds to a second rating, in which the first rating and the second rating are different.

6. The method of claim 4, in which the color corresponds to the quantity of documents received.

7. The method of claim 4, in which the color corresponds to a marketability of the life insurance policy.

8. The method of claim 1, further comprising:
   storing the received documents, the determined quality and the rating into a database that comprises policy information for a plurality of available life insurance policies.

9. The method of claim 8 further comprising:
   receiving at least one search criterion from a purchaser;
   searching the database for at least one life insurance policy that matches the at least one search criterion;
   retrieving the at least one life insurance policy that matches the at least one search criterion; and
   displaying the at least one retrieved life insurance policy.

10. The method of claim 1, in which a purchaser of the life insurance policy assumes payment of the life insurance policy until death of the insured.

11. The method of claim 1, in which a purchaser of the insurance policy is listed as a beneficiary of the life insurance policy in exchange for payment of the settlement amount to the insured.

12. An apparatus comprising:
    a processor; and
    a memory, in which the memory stores instructions which, when executed by the processor, direct the processor to:
    receive an indication that an insured intends to sell a life insurance policy in exchange for a settlement amount;
    transmit a request for at least one document that supports that the life insurance policy, in which the remote device and the processor are in communication over a network;
    receive, in response to the request, the at least one document that supports the life insurance policy;
    determine a respective quality for each received document based on at least one of: a source of the document, a type of the document, and a pre-determined level of importance of the document;
    determiner a quantity of documents received in response to the request;
    assign, based on the quantity of documents received and the quality of each received document, a rating to the life insurance policy, in which the rating affects the settlement amount; and
    display the rating that is assigned to the life insurance policy.

13. The apparatus of claim 12, in which the memory stores instructions which, when executed by the processor, further direct the processor to:

transmit a request to authenticate at least one received document; and receive an authentication of the at least one received document.

14. The apparatus of claim 12, in which the act of determining the respective quality of each received document further comprising:

determining the quality based on a decision tree.

15. The apparatus of claim 12, in which the act of displaying the rating further comprises:

displaying a color that is based on the rating.

16. The apparatus of claim 15, in which the act of displaying a color further comprises:

assigning a respective color based on each rating, in which a first color corresponds to a first rating and a second color corresponds to a second rating, in which the first rating and the second rating are different.

17. The apparatus of claim 15, in which the color corresponds to the quantity of documents received.

18. The apparatus of claim 15, in which the color corresponds to a marketability of the life insurance policy.

19. The apparatus of claim 12, in which the memory stores instructions which, when executed by the processor, further direct the processor to:

store the received documents, the determined quality and the rating into a database that comprises policy information for a plurality of available life insurance policies.

20. The apparatus of claim 19, in which the memory stores instructions which, when executed by the processor, further direct the processor to:

receive at least one search criterion from a purchaser;

search the database for at least one life insurance policy that matches the at least one search criterion;

retrieve the at least one life insurance policy that matches the at least one search criterion; and display the at least one retrieved life insurance policy.

21. The apparatus of claim 19, in which a purchaser of the life insurance policy assumes payment of the life insurance policy until death of the insured.

22. The apparatus of claim 19, in which a purchaser of the insurance policy is listed as a beneficiary of the life insurance policy in exchange for payment of the settlement amount to the insured.

23. An article of manufacture comprising:

a storage medium, in which the storage medium stores instructions which, when executed by a processor, direct the processor to:

receive an indication that an insured intends to sell a life insurance policy in exchange for a settlement amount;

transmit a request for at least one document that supports that the life insurance policy, in which the remote device and the processor are in communication over a network;

receive, in response to the request, the at least one document that supports the life insurance policy;

determine a respective quality for each received document based on at least one of: a source of the document, a type of the document, and a pre-determined level of importance of the document;

determiner a quantity of documents received in response to the request;

assign, based on the quantity of documents received and the quality of each received document, a rating to the life insurance policy, in which the rating affects the settlement amount; and display the rating that is assigned to the life insurance policy.

24. The article of manufacture of claim 23, in which the storage medium stores instructions which, when executed by the processor, further direct the processor to:

transmit a request to authenticate at least one received document; and receive an authentication of the at least one received document.

25. The article of manufacture of claim 23, in which the act of determining the respective quality of each received document further comprising:

determining the quality based on a decision tree.

26. The article of manufacture of claim 23, in which the act of displaying the rating further comprises:

displaying a color that is based on the rating.

27. The article of manufacture of claim 26, in which the act of displaying a color further comprises:

assigning a respective color based on each rating, in which a first color corresponds to a first rating and a second color corresponds to a second rating, in which the first rating and the second rating are different.

28. The article of manufacture of claim 26, in which the color corresponds to the quantity of documents received.

29. The article of manufacture of claim 26, in which the color corresponds to a marketability of the life insurance policy.

30. The article of manufacture of claim 23, in which the storage medium stores instructions which, when executed by the processor, further direct the processor to:

store the received documents, the determined quality and the rating into a database that comprises policy information for a plurality of available life insurance policies.

31. The article of manufacture of claim 30, in which the storage medium stores instructions which, when executed by the processor, further direct the processor to:

receive at least one search criterion from a purchaser;

search the database for at least one life insurance policy that matches the at least one search criterion;

retrieve the at least one life insurance policy that matches the at least one search criterion; and display the at least one retrieved life insurance policy.

32. The article of manufacture of claim 23, in which a purchaser of the life insurance policy assumes payment of the life insurance policy until death of the insured.

33. The article of manufacture of claim 23, in which a purchaser of the insurance policy is listed as a beneficiary of the life insurance policy in exchange for payment of the settlement amount to the insured.

* * * * *